United States Patent
Leather et al.

(10) Patent No.: US 11,295,507 B2
(45) Date of Patent: Apr. 5, 2022

(54) SPATIAL PARTITIONING IN A MULTI-TENANCY GRAPHICS PROCESSING UNIT

(71) Applicant: ADVANCED MICRO DEVICES, INC., Santa Clara, CA (US)

(72) Inventors: Mark Leather, Santa Clara, CA (US); Michael Mantor, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/091,957

(22) Filed: Nov. 6, 2020

(65) Prior Publication Data

US 2021/0241516 A1 Aug. 5, 2021

Related U.S. Application Data

(60) Provisional application No. 62/970,028, filed on Feb. 4, 2020.

(51) Int. Cl.
  *G06T 15/00* (2011.01)
  *G06F 9/48* (2006.01)
  *G06T 1/20* (2006.01)

(52) U.S. Cl.
  CPC .......... *G06T 15/005* (2013.01); *G06F 9/4881* (2013.01); *G06T 1/20* (2013.01)

(58) Field of Classification Search
  CPC ........ G06T 15/005; G06T 1/20; G06F 9/4881
  See application file for complete search history.

(56) References Cited

U.S. PATENT DOCUMENTS

| | | | |
|---|---|---|---|
| 9,293,109 B2* | 3/2016 | Duluk, Jr. | G06T 1/60 |
| 10,593,094 B1* | 3/2020 | Havlir | G06T 15/005 |
| 2007/0091089 A1* | 4/2007 | Jiao | G06T 15/80 345/426 |
| 2009/0322751 A1 | 12/2009 | Oneppo et al. | |
| 2010/0123717 A1 | 5/2010 | Jiao | |
| 2011/0080415 A1 | 4/2011 | Duluk, Jr. et al. | |

(Continued)

FOREIGN PATENT DOCUMENTS

KR 1020140027077 A 3/2014

OTHER PUBLICATIONS

International Search Report and Written Opinion issued in Application No. PCT/US2021/016440, dated May 25, 2021, 13 Pages.

*Primary Examiner* — Jennifer Mehmood
*Assistant Examiner* — Donna J. Ricks

(57) ABSTRACT

A graphics processing unit (GPU) or other apparatus includes a plurality of shader engines. The apparatus also includes a first front end (FE) circuit and one or more second FE circuits. The first FE circuit is configured to schedule geometry workloads for the plurality of shader engines in a first mode. The first FE circuit is configured to schedule geometry workloads for a first subset of the plurality of shader engines and the one or more second FE circuits are configured to schedule geometry workloads for a second subset of the plurality of shader engines in a second mode. In some cases, a partition switch is configured to selectively connect the first FE circuit or the one or more second FE circuits to the second subset of the plurality of shader engines depending on whether the apparatus is in the first mode or the second mode.

20 Claims, 7 Drawing Sheets

(56) References Cited

U.S. PATENT DOCUMENTS

| | | | |
|---|---|---|---|
| 2011/0216078 A1* | 9/2011 | Blinzer | G09G 5/363 |
| | | | 345/502 |
| 2016/0180486 A1 | 6/2016 | Rao et al. | |
| 2020/0192704 A1* | 6/2020 | Stankevichus | G06F 3/0659 |
| 2020/0310883 A1* | 10/2020 | Valerio | G06F 9/5038 |

* cited by examiner

US 11,295,507 B2

SPATIAL PARTITIONING IN A MULTI-TENANCY GRAPHICS PROCESSING UNIT

CROSS REFERENCE TO RELATED APPLICATIONS

This application claims priority to the U.S. Provisional Patent Application Ser. No. 62/970,028 filed on Feb. 4, 2020 and entitled "Spatial Partitioning in a Multi-Tenancy Graphics Processing Unit," which is hereby incorporated by reference in its entirety.

BACKGROUND

Conventional processing systems include processing units such as a central processing unit (CPU) and a graphics processing unit (GPU) that implement audio, video, and multimedia applications, as well as general purpose computing in some cases. The physical resources of a GPU include shader engines and fixed function hardware units that are used to implement user-defined reconfigurable virtual pipelines. For example, a conventional graphics pipeline for processing three-dimensional (3-D) graphics is formed of a sequence of fixed-function hardware block arrangements supported by programmable shaders. These arrangements are usually specified by a graphics application programming interface (API) such as the Microsoft DX 11/12 specifications or Khronos Group OpenGL/Vulkan APIs.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
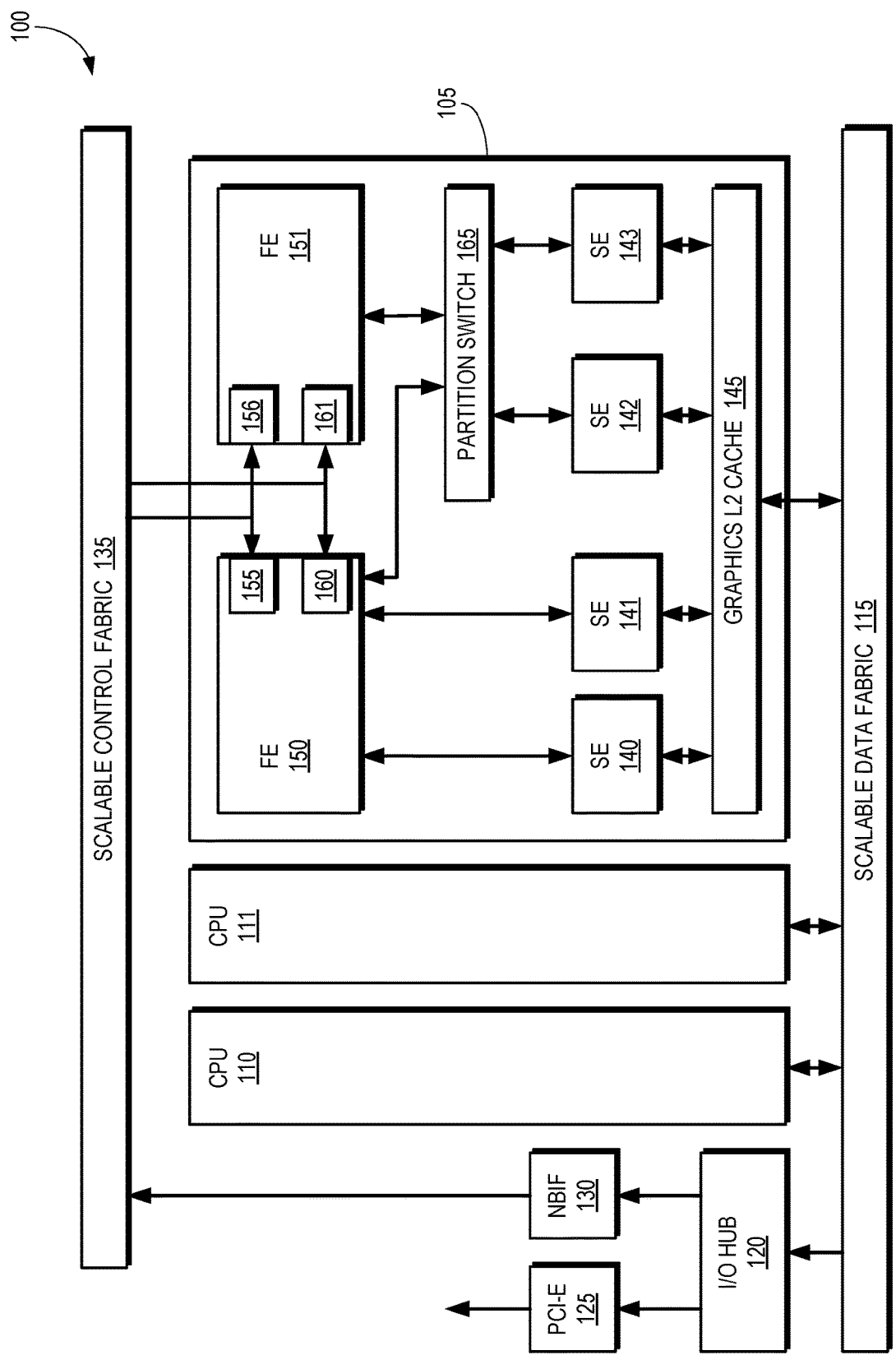
FIG. 1 is a block diagram of a processing system that implements spatial partitioning in a graphics processing unit (GPU) according to some embodiments.

Processing on a GPU is typically initiated by application programming interface (API) calls (e.g., draw calls) that are processed by a CPU. A draw call is a command that is generated by the CPU and transmitted to the GPU to instruct the GPU to render an object (or a portion of an object) in a frame. The draw call includes information defining textures, states, shaders, rendering objects, buffers, and the like that are used by the GPU to render the object or portion thereof. In response to receiving a draw call, the GPU renders the object to produce values of pixels that are provided to a display, which uses the pixel values to display an image that represents the rendered object. The object is represented by primitives such as triangles, patches, or other polygons that include multiple vertices connected by corresponding edges. An input assembler fetches the vertices based on topological information indicated in the draw call. The vertices are provided to a graphics pipeline for shading according to corresponding commands that are stored in a command buffer prior to execution by the GPU. The commands in the command buffer are written to a queue (or ring buffer) and a scheduler schedules the command buffer at the head of the queue for execution on the GPU.

The hardware used to implement the GPU is typically configured based on the characteristics of an expected workload. For example, if the workload processed by the GPU is expected to produce graphics at 8K resolution, the GPU processes up to eight primitives per clock cycle to guarantee a target quality of service and level of utilization. For another example, if the workload processed by the GPU is expected to produce graphics at a much lower 1080p resolution, the GPU guarantees a target quality of service and level of utilization when processing workloads at the lower 1080p resolution. Although conventional GPUs are optimized for a predetermined type of workload, many GPUs are required to process workloads that have varying degrees of complexity and output resolution. For example, a flexible cloud gaming architecture includes servers that implement sets of GPUs for concurrently executing a variety of games at different levels of user experience that potentially range from 1080p resolution all the way up to 8K resolution depending on the gaming application and the level of experience requested by the user. Although a lower-complexity or lower-resolution game can execute on a GPU that is optimized for higher complexity or resolution, a difference between the expected complexity or resolution of an optimized GPU and the actual complexity or resolution required by the application often leads to underutilization of the resources of the higher performance GPU. For example, serial dependencies between commands in a lower complexity/resolution game executing on a higher performance GPU reduce the amount of pixel shading that is performed in parallel, which results in underutilization of the resources of the GPU.

FIGS. 1-9 disclose embodiments of a reconfigurable graphics processing unit (GPU) that includes front end (FE) circuitry and shader engines that are spatially partitioned to execute multiple concurrent graphics streams having different characteristics. The FE circuitry fetches primitives for geometry workloads, performs scheduling of the geometry workloads for execution on the shader engines and, in some cases, handles serial synchronization, state updates, draw calls, cache activities, and tessellation of primitives. The shader engines shade the vertices of the primitives (as scheduled by the FE circuitry) and shade the pixels generated based on the shaded primitives. In some embodiments, the FE circuitry includes multiple FE circuits that selectively schedule the geometry workloads for concurrent execution on corresponding subsets of the shader engines. Using different FE circuits to schedule workloads for execution on different subsets of the shader engines is referred to herein as "spatial partitioning" of the shader engines.

The amount of spatial partitioning that is available in a reconfigurable GPU depends on the number of independent FE circuits implemented in the FE circuitry. For example, if the FE circuitry includes two FE circuits, a first FE circuit schedules the geometry workloads for all the shader engines in a first operational mode. In a second (partitioned) operational mode, the first FE circuit schedules the geometry workloads for execution on a first subset of the shader engines and a second FE circuit schedules the geometry workloads for execution on a second subset of the shader engines concurrently with execution of the geometry workloads on the first subset. In some embodiments, the multiple FE circuits are configured based on different levels of user experience corresponding to different complexities or graphics resolutions. For example, a GPU including four shader engines include a first FE circuit that is optimized for high complexity/resolution, two second FE circuits that are optimized for medium complexity/resolution, and a third FE circuit that is optimized for low complexity/resolution. The GPU is therefore reconfigurable to support one high complexity/resolution application (such as a game that provides 8K resolution) using the first FE circuit, two medium complexity/resolution applications (such as games that provide 4K resolution) using the two second FE circuits, or four low complexity/resolution applications (such as games that provide 1080p resolution) using the first, second, and third FE circuits. In some embodiments, one or more of the multiple FE circuits support multiple concurrent threads using time division multiplexing.

FIG. 1 is a block diagram of a processing system 100 that implements spatial partitioning in a multi-tenancy graphics processing unit (GPU) 105 according to some embodiments. The processing system 100 includes one or more central processing units (CPUs) 110, 111. Although two CPUs 110, 111 are shown in FIG. 1, some embodiments of the processing system 100 include more or fewer CPUs. A scalable data fabric (SDF) 115 supports data flows between endpoints within the processing system 100. Some embodiments of the SDF 115 support data flows between connecting points such as peripheral component interface (PCI) physical layers, memory controllers, universal serial bus (USB) hubs, computing and execution units including the GPU 105 and the CPUs 110, 111, as well as other endpoints. In the illustrated embodiment, the SDF 115 is connected to an input/output (I/O) hub 120, which is in turn connected to a PCI express (PCI-E) bus 125 and an NBIF 130. The processing system 100 also includes a scalable control fabric (SCF) 135 is a control communication plane that conveys system control signals within the processing system 100. Examples of system control signals are control signals used to support thermal and power management, tests, security, and the like.

The GPU 105 includes a set of shader engines (SE) 140, 141, 142, 143 (collectively referred to herein as "the SE 140-143") that are used to execute commands concurrently or in parallel. Some embodiments of the SE 140-143 are configured using information in draw calls received from one of the CPUs 110, 111 to shade vertices of primitives that represent a model of a scene. The SE 140-143 also shade the pixels generated based on the shaded primitives and provide the shaded pixels to a display for presentation for user, e.g., via the I/O hub 120. Although four shader engines are shown in FIG. 1, some embodiments of the GPU 105 include more or fewer shader engines. The SE 140-143 are connected to a graphics L2 cache 145 that stores frequently used data and instructions. In some embodiments, the L2 cache 145 is connected to one or more L1 caches that are implemented in the SE 140-143 and one or more L3 caches (or other last level caches) implemented in the processing system 100. The caches form a cache hierarchy that includes the L2 cache 145. The other caches in the cache hierarchy are not shown in FIG. 1 in the interest of clarity.

Front end (FE) circuitry in the GPU 105 fetches primitives for geometry workloads, performs scheduling of the geometry workloads for execution on the shader engines and, in some cases, handles serial synchronization, state updates, draw calls, cache activities, and tessellation of primitives. The FE circuitry in the GPU 105 includes FE circuits 150, 151, although some embodiments of the FE circuitry are partitioned to include additional FE circuits, as discussed herein. The FE circuits 150, 151 include command processors 155, 156 that receives command buffers for execution on the SE 140-143. The FE circuits 150, 151 also include graphics register bus managers (GRBMs) 160, 161 that act as hubs for register read and write operations that support multiple masters and multiple slaves.

The GPU 105 operates in either a first mode or a second, spatially partitioned mode. In the first mode, the FE circuit 150 schedules geometry workloads for the SE 140-143. In the second mode, the FE circuit 150 schedules geometry workloads for a first subset of the SE 140-143 and the FE circuit 150 schedules geometry workloads for a second subset of the SE 140-143. The first subset includes the SE 140, 141 and the second subset includes the SE 142, 143, although other groupings of the SE 140-143 into subsets are used in some embodiments. The GPU 105 includes a partition switch 165 that selectively connects the FE circuits 150, 151 to the first and second subsets of the SE 140-143 depending on whether the GPU 105 is operating in the first mode or the second mode. In the illustrated embodiment, the partition switch 165 determines the operational status of the GPU 105. If the GPU 105 is operating in the first mode, the partition switch 165 connects the FE circuit 150 to the SE 142, 143 so that the FE circuit 150 schedules operations to all the SE 140-143. If the GPU 105 is operating in the second mode, the partition switch 165 connects the FE circuit 151 to the SE 142, 143 so that the FE circuit 150 schedules operations to the SE 140, 141 and the FE circuit 151 schedules operations to the SE 142, 143.

Figure 2:
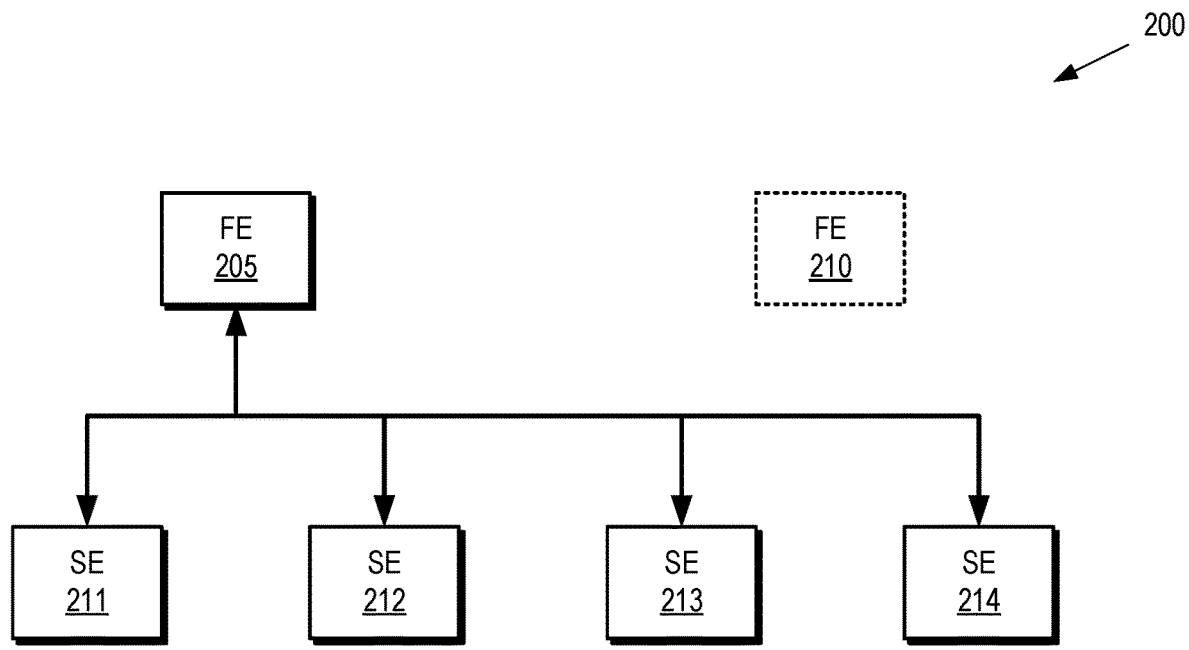
FIG. 2 is a block diagram of a mapping of front end (FE) circuits to a set of shader engines (SE) for a GPU operating in a first mode according to some embodiments.

FIG. 2 is a block diagram of a mapping 200 of FE circuits 205, 210 to a set of SE 211, 212, 213, 214 for a GPU operating in a first mode according to some embodiments. The mapping 200 indicates a mapping of some embodiments of the FE circuits 150, 151 to the SE 140-143 in the GPU 105 shown in FIG. 1. The GPU is operating in the first mode and the FE circuit 205 is mapped to all the SE 211-214. The FE circuit 205 therefore schedules commands for concurrent execution on the SE 211-214. The FE circuit 210 is not mapped to any of the SE 211-214 and therefore does not schedule commands for execution on any of the SE 211-214, as indicated by the dashed outline of the box representing the FE circuit 210.

Figure 3:
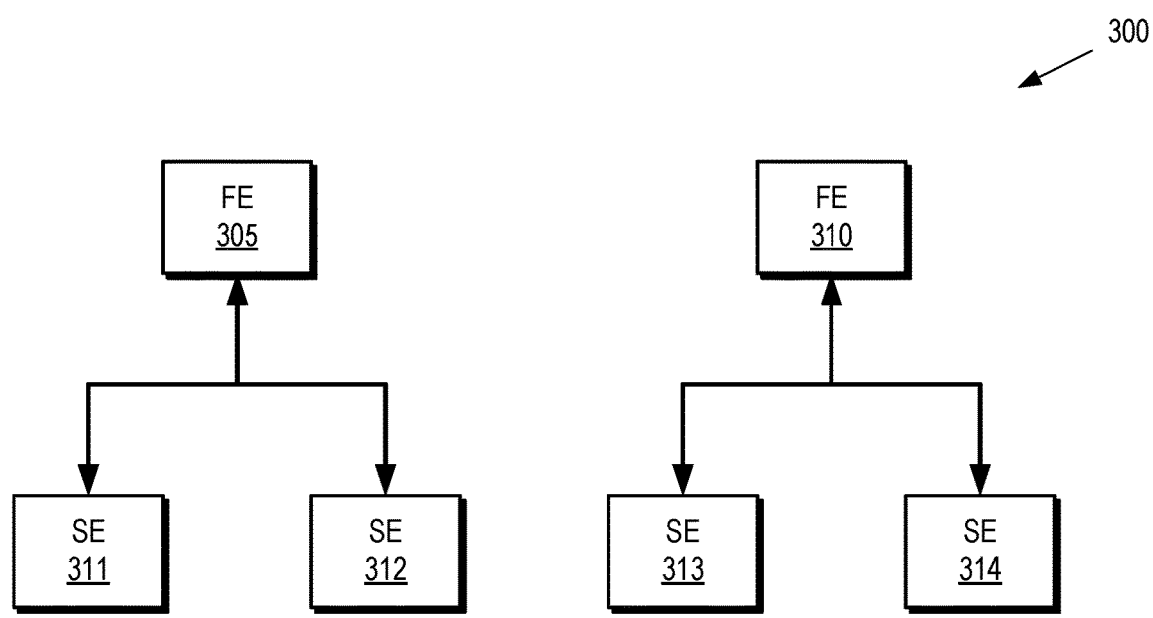
FIG. 3 is a block diagram of a mapping of FE circuits to a set of SE for a GPU operating in a second mode according to some embodiments.

FIG. 3 is a block diagram of a mapping 300 of FE circuits 305, 310 to a set of SE 311, 312, 313, 314 for a GPU operating in a second mode according to some embodiments. The mapping 300 indicates a mapping of some embodiments of the FE circuits 150, 151 to the SE 140-143 in the GPU 105 shown in FIG. 1. The GPU is operating in the second mode and the FE circuit 305 is mapped to a first subset of the SE 311-314 that includes the SE 311, 312. The FE circuit 305 therefore schedules commands for execution on the SE 311, 312. The FE circuit 310 is mapped to a second subset of the SE 311-314 that includes the SE 313, 314. The FE circuit 310 therefore schedules commands for execution on the SE 313, 314. The FE circuit 305, 310 schedule commands for concurrent execution on their corresponding first and second subsets of the SE 311-314.

Figure 4:
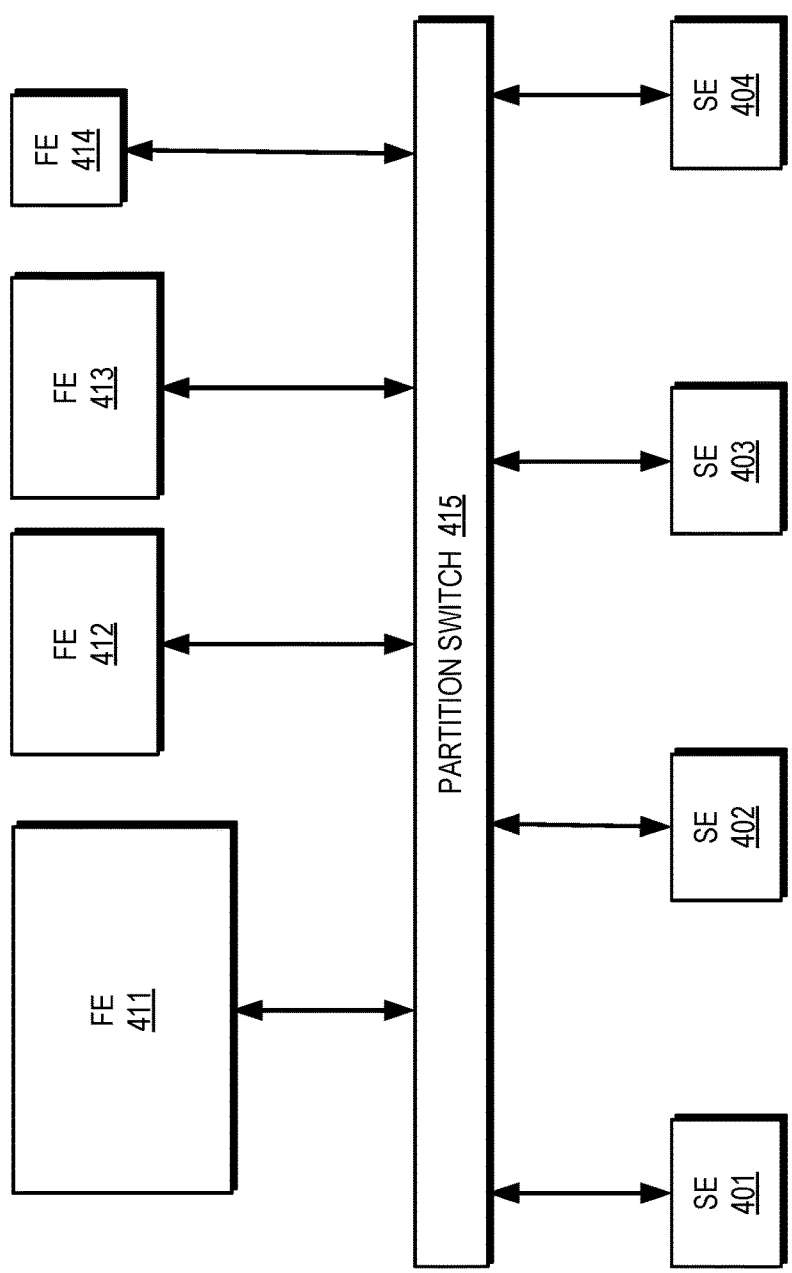
FIG. 4 is a block diagram of a GPU that includes a set of FE circuits that are configured based on different characteristics of applications that provide instructions for execution by the GPU according to some embodiments.

FIG. 4 is a block diagram of a GPU 400 that includes a set of FE circuits that are configured based on different characteristics of applications that provide instructions for execution by the GPU according to some embodiments. The GPU 400 includes a set of SE 401, 402, 403, 404, which are collectively referred to herein a "the SE 401-404" and execute instructions concurrently or in parallel. The GPU 400 also includes FE circuits 411, 412, 413, 414, which are collectively referred to herein as "the FE circuits 411-414." The FE circuits 411-414 are configured based on different levels of user experience corresponding to different complexities or graphics resolutions. In the illustrated embodiment, the FE circuit 411 is configured based upon the requirements of applications that have a high complexity or graphics resolution, such as a game that implements a sophisticated physics engine or provides 8K resolution. The FE circuits 412, 413 are configured based upon the requirements of applications that have a medium complexity or graphics resolution, such as games that provide 4K resolution. The FE circuit 414 is configured based upon the requirements of applications that have low complexity or graphics solution resolution, such as games that provide 1080p resolution.

A partition switch 415 selectively maps subsets of the FE circuits 411-414 to corresponding subsets of the SE 401-404. The map indicates connections between the FE circuits 411-414 and the SE 401-404, as well as indicating which of the FE circuits 411-414 is responsible for scheduling commands to one or more of the SE 401-404. Some embodiments of the partition switch 415 selectively map the subsets of the FE circuits 411-414 to the corresponding subsets of the SE 401-404 based on characteristics of applications that provide commands for execution on the SE 401-404. For example, the GPU 400 can operate in one of a plurality of modes depending on the characteristics of the applications. The partition switch 415 determines the current operation mode based on either signaling associated with the GPU 400 or using other indications of the characteristics of the application. The partition switch 415 then selectively determines a mapping between the SE 401-404 and the FE circuits 411-414 based on the operating mode.

Figure 5:
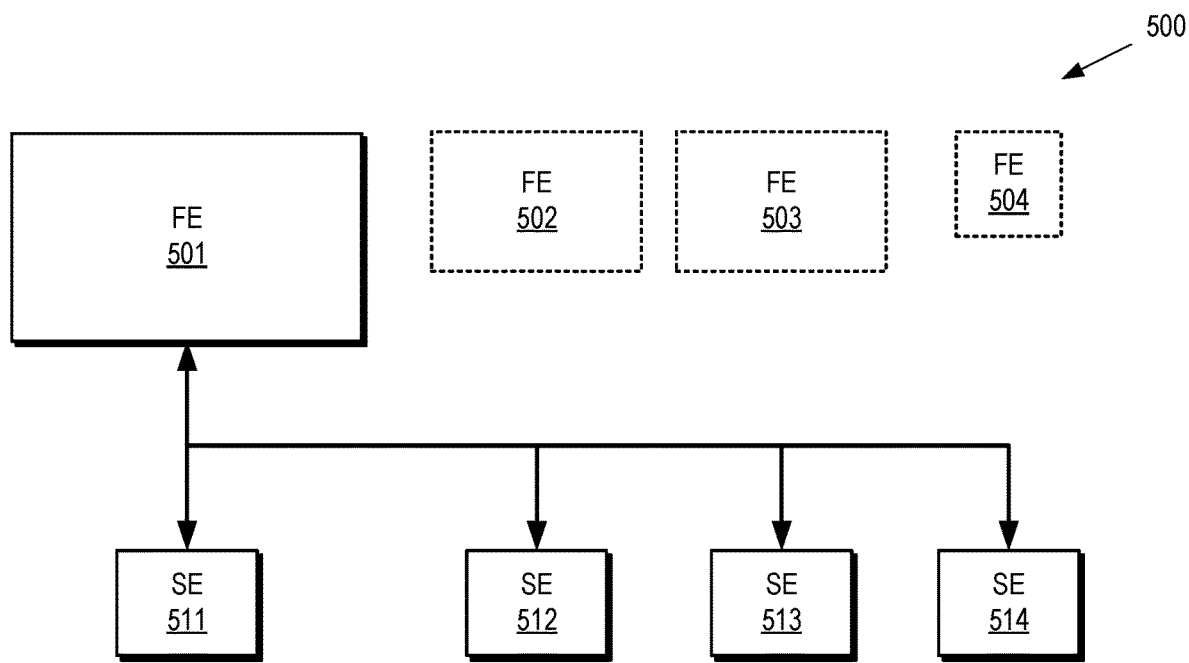
FIG. 5 is a block diagram of a mapping of FE circuits to a set of SE for a GPU operating at a high level of user experience according to some embodiments.

FIG. 5 is a block diagram of a mapping 500 of FE circuits 501, 502, 503, 504 to a set of SE 511, 512, 513, 514 for a GPU operating at a high level of user experience according to some embodiments. The mapping 500 indicates a mapping of some embodiments of the FE circuits 411-414 to the SE 401-404 in the GPU 400 shown in FIG. 4. The GPU is executing commands provided by an application that requires a relatively high level of user experience, e.g., a high level of complexity or graphics resolution. The FE circuit 501 supports high levels of user experience and therefore the FE circuit 501 is mapped to the SE 511-514. The FE circuit 501 schedules commands for concurrent execution on the SE 511-514. The FE circuits 502-504 are not mapped to the SE 511-514 and therefore do not schedule commands for execution on the SE 511-514, as indicated by the dashed boxes that represent the FE circuits 502-504.

Figure 6:
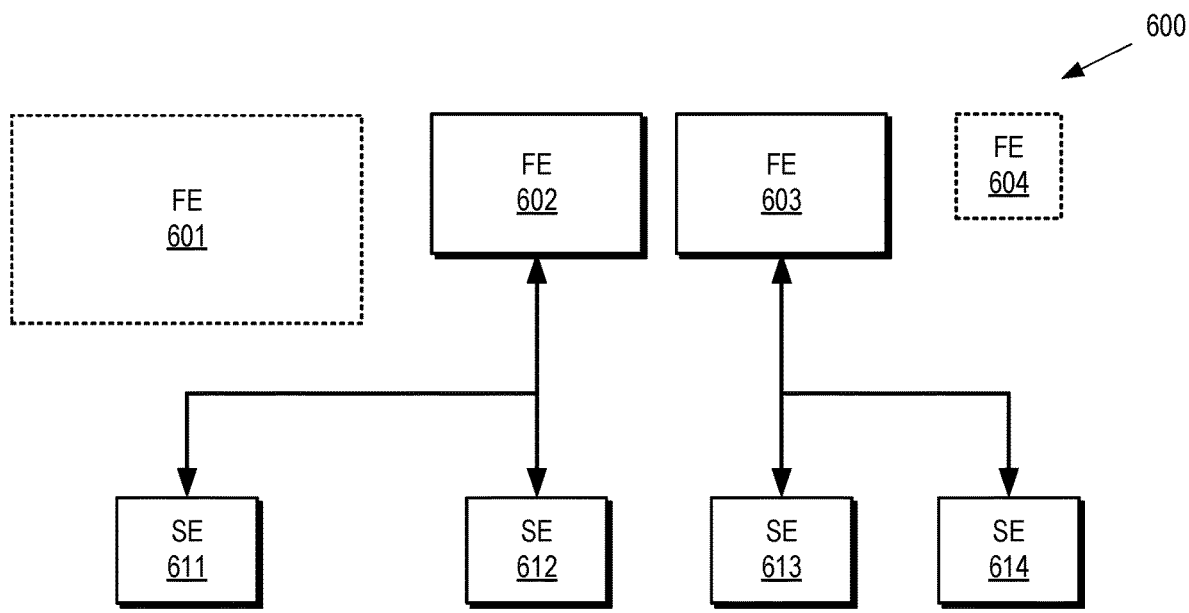
FIG. 6 is a block diagram of a mapping of FE circuits to a set of SE for a GPU operating at a medium level of user experience according to some embodiments.

FIG. 6 is a block diagram of a mapping 600 of FE circuits 601, 602, 603, 604 to a set of SE 611, 612, 613, 614 for a GPU operating at a medium level of user experience according to some embodiments. The mapping 600 indicates a mapping of some embodiments of the FE circuits 411-414 to the SE 401-404 in the GPU 400 shown in FIG. 4. The GPU is executing commands provided by an application that requires a medium level of user experience, e.g., a medium level of complexity or graphics resolution. The FE circuits 602, 603 supports medium levels of user experience. In the illustrated embodiment, the FE circuit 602 is mapped to the SE 611, 612 and the FE circuit 603 is mapped to the SE 613, 614. The FE circuits 602, 603 therefore schedule commands for concurrent execution on the corresponding subsets of the SE 611-614. The FE circuits 601, 604 are not mapped to the SE 611-614 and therefore do not schedule commands for execution on the SE 611-614, as indicated by the dashed boxes that represent the FE circuits 601, 604. However, in some embodiments, the FE circuit 601 is mapped to a subset of the SE 611-614 because the FE circuit 601 is capable of scheduling commands for applications requiring a medium level of user experience.

Figure 7:
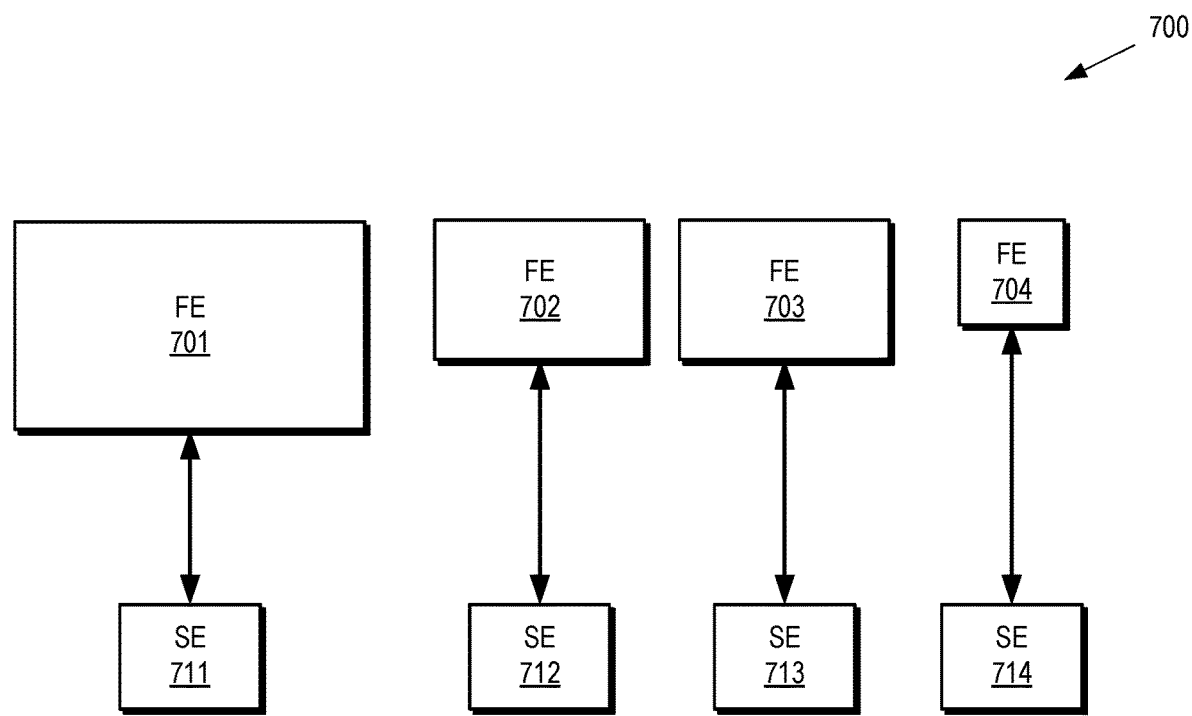
FIG. 7 is a block diagram of a mapping of FE circuits to a set of SE for a GPU operating at a low level of user experience according to some embodiments.

FIG. 7 is a block diagram of a mapping 700 of FE circuits 701, 702, 703, 704 to a set of SE 711, 712, 713, 714 for a GPU operating at a low level of user experience according to some embodiments. The mapping 700 indicates a mapping of some embodiments of the FE circuits 411-414 to the SE 401-404 in the GPU 400 shown in FIG. 4. The GPU is executing commands provided by an application that requires a low level of user experience, e.g., a low level of complexity or graphic resolution. All the FE circuits 701-704 are capable of scheduling commands to the SE 711-714 from applications that require a low level of user experience. The FE circuits 701-704 are therefore mapped to corresponding SE 711-714. For example, the FE circuit 701 is mapped to (and schedules commands for) the SE 711, the FE circuit 702 is mapped to (and schedules commands for) the SE 712, the FE circuit 703 is mapped to (and schedules commands for) the SE 713, and the FE circuit 704 is mapped to (and schedules commands for) the SE 714. The FE circuits 701-704 schedule commands for concurrent execution on the corresponding SE 711-714.

Figure 8:
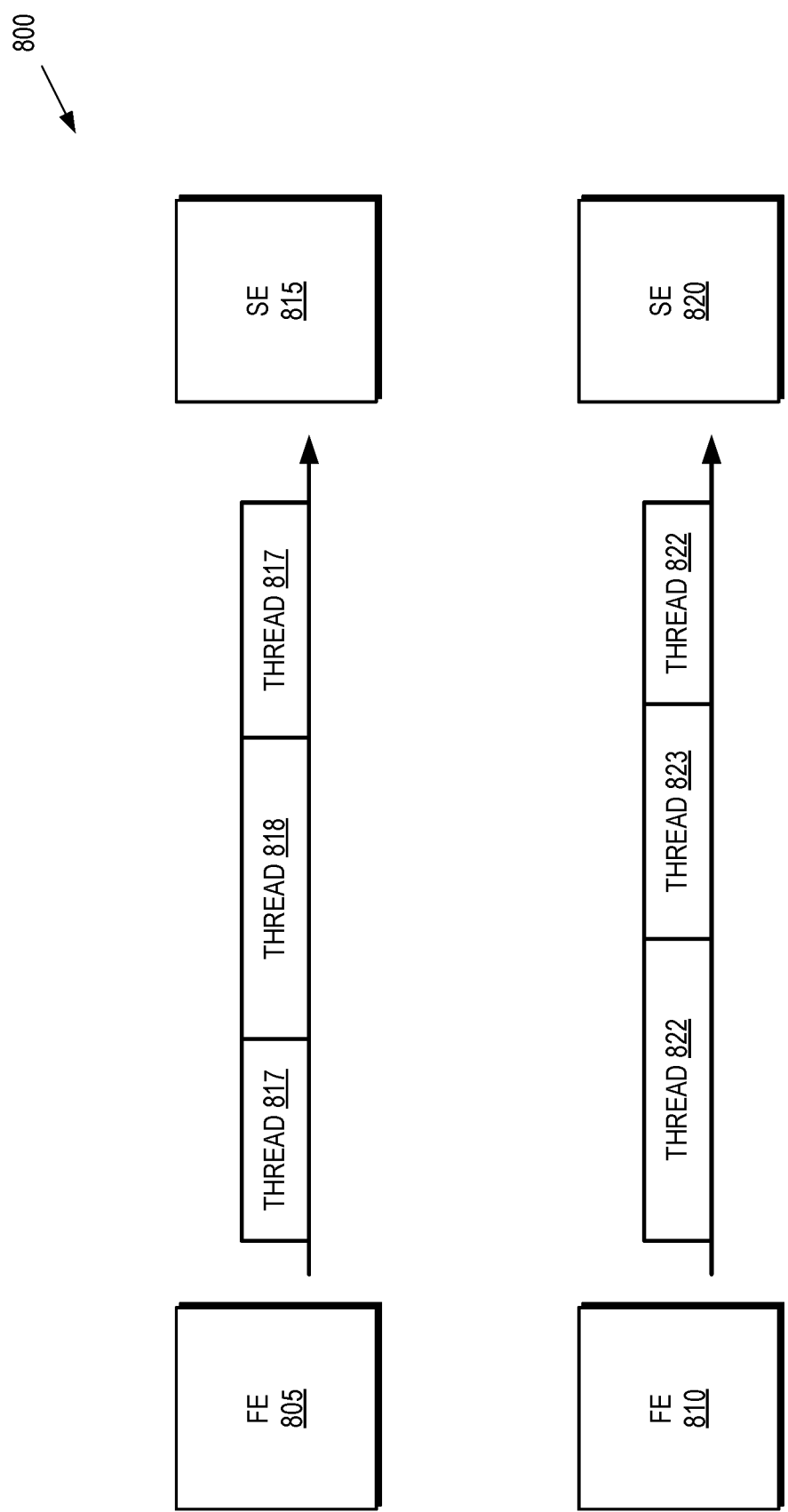
FIG. 8 is a block diagram of a GPU that includes a set of FE circuits that schedule instructions in time division multiplexed threads for execution by a set of SE in the GPU according to some embodiments.

FIG. 8 is a block diagram of a GPU 800 that includes a set of FE circuits that schedule instructions in time division multiplexed threads for execution by a set of SE in the GPU according to some embodiments. The GPU 800 represents some embodiments of the GPU 105 shown in FIG. 1. The set of FE circuits includes a first FE circuit 805 and a second FE circuit 810, although some embodiments of the GPU 800 include more FE circuits in the set. The first FE circuit 805 schedules commands for execution on one or more corresponding SE including the first SE 815. In the illustrated embodiment, the first FE circuit 805 schedules commands for a first thread 817 during a first time interval and a third time interval. The first FE circuit 805 also schedules commands or a second thread 818 during a second time interval that is time division multiplexed with the first and third time intervals. The second FE circuit 810 schedules commands for execution on one or more corresponding SE including the second SE 820. In the illustrated embodiment, the second FE circuit 810 schedules commands for a third thread 822 during fourth time interval and a fifth time interval. The second FE unit 810 also schedules commands for a fourth thread 823 during a sixth time interval that is time division multiplexed with the fourth and fifth time intervals. Thus, the FE circuits 805, 810 schedule commands in the threads 817, 818, 822, 823 for concurrent execution on the SE 815, 820.

Figure 9:
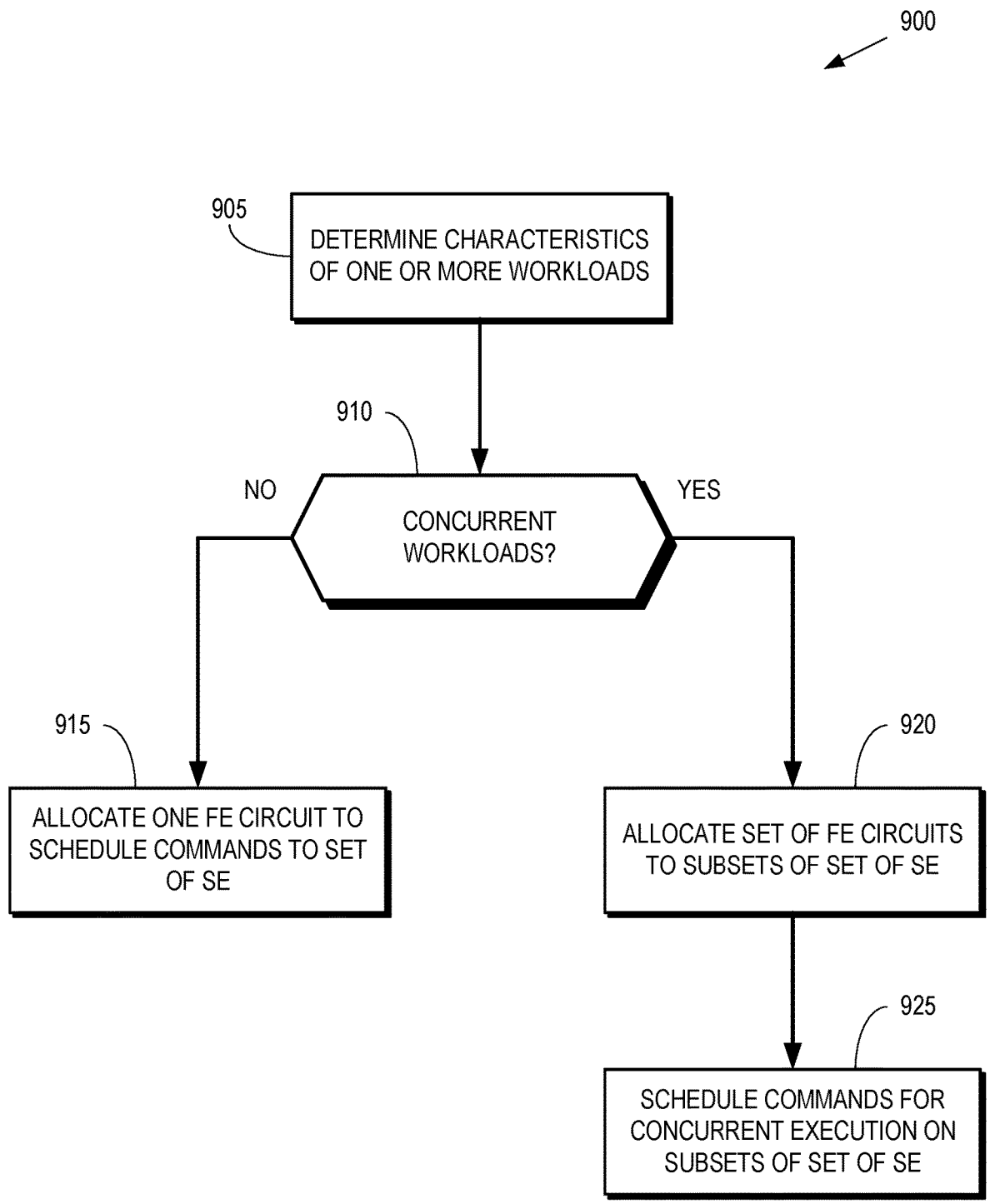
FIG. 9 is a flow diagram of a method of selectively allocating FE circuits to schedule commands for concurrent execution on a set of SE according to some embodiments.

FIG. 9 is a flow diagram of a method 900 of selectively allocating FE circuits to schedule commands for concurrent execution on a set of SE according to some embodiments. The method 900 is implemented in some embodiments of the GPU 800 shown in FIG. 1.

At block 905, the GPU determines characteristics of one or workloads (or threads) that are provided for execution on the GPU. In some embodiments, the characteristics include, but are not limited to, complexity of the workloads or graphics resolutions required (or specified or preferred) by the workloads. The characteristics are determined based on information provided in the workload (or thread) or using other information that configures the GPU for execution of the workload (or thread).

At decision block 910, the GPU determines whether one or more workloads (or threads) are to be executed concurrently. Examples of workloads that are executed concurrently include workloads having a complexity or graphics resolution that is less than or equal to a complexity or graphics resolution that is used to configure multiple FE circuitry implemented in the GPU, as discussed herein. If only a single workload is to be executed by the GPU, the method 900 flows to block 915. If multiple workloads are to be scheduled concurrently, the method 900 flows to block 920.

At block 915, one FE circuit is allocated to schedule commands for concurrent execution on the set of SE. The other FE circuits that are available in the GPU are not allocated to schedule commands for execution on any of the set of SE.

At block 920, a set of FE circuits are allocated to schedule commands for concurrent execution by corresponding subsets of the set of SE. At block 925, the set of FE circuits schedule commands for concurrent execution by the corresponding subsets. For example, if two FE circuits are allocated, a first FE circuit schedules commands for execution on a first subset of the set of SE and a second FE circuit schedules commands for execution on a second subset of the set of SE. The first and second subsets execute the scheduled commands concurrently.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above can implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. An apparatus comprising:
   a plurality of shader engines; and
   a first front end (FE) circuit and at least one second FE circuit, wherein the first FE circuit is configured to schedule geometry workloads for the plurality of shader engines in a first mode, and wherein the first FE circuit is configured to schedule geometry workloads for a first subset of the plurality of shader engines and the at least one second FE circuit is configured to schedule geometry workloads for a second subset of the plurality of shader engines in a second mode.

2. The apparatus of claim 1, further comprising:
   a partition switch configured to selectively connect the first FE circuit or the at least one second FE circuit to the second subset of the plurality of shader engines depending on whether the apparatus is in the first mode or the second mode.

3. The apparatus of claim 1, wherein the first FE circuit is configured to schedule geometry workloads for concurrent execution by the plurality of shader engines in the first mode, and wherein, in the second mode, the first FE circuit is configured to schedule geometry workloads for execution by the first subset concurrently with execution of geometry workloads that are scheduled by the at least one second FE circuit for execution on the second subset.

4. The apparatus of claim 1, wherein the first FE circuit and the at least one second FE circuit are configured based on different levels of user experience corresponding to at least one of complexities or graphics resolutions.

5. The apparatus of claim 4, wherein the first FE circuit is configured based on a first level of user experience corresponding to at least one of a first complexity or a first graphics resolution, and wherein the at least one second FE circuit is configured based on at least one second level of user experience corresponding to at least one of a second complexity or a second graphics resolution, the at least one of the first complexity or the first graphics resolution being higher than the at least one of the second complexity or the second graphics resolution.

6. The apparatus of claim 5, wherein the at least one second FE circuit comprises at least one third FE circuit that is configured based on at least one third complexity or third graphics resolution that are lower than at least one of the first complexity or the first graphics resolution, and wherein the at least one second FE circuit comprises at least one fourth FE circuit that is configured based on at least one fourth complexity or fourth graphics resolution that is lower than the at least one third complexity or third graphics resolution.

7. The apparatus of claim 6, wherein the first FE circuit is configured to schedule geometry workloads for the plurality shader engines in the first mode for a first application requiring at least one of the first complexity or the first graphics resolution.

8. The apparatus of claim 7, wherein the first FE circuit and the at least one third FE circuit are configured to schedule geometry workloads for corresponding subsets of the plurality of shader engines for a second application requiring at least one of the third complexity or the third graphics resolution.

9. The apparatus of claim 8, wherein the first FE circuit, the at least one third FE circuit, and the fourth FE circuit are configured to schedule geometry workloads for corresponding subsets of the plurality of shader engines for a third application requiring at least one of the fourth complexity or the fourth graphics resolution.

10. The apparatus of claim 1, wherein at least one of the first FE circuit or the at least one second FE circuit is configured to support multiple concurrent threads using time division multiplexing.

11. A method comprising:
fetching, at a first front end (FE) circuit and at least one second FE circuit, geometry workloads for a plurality of shader engines;
in a first mode, scheduling the geometry workloads at the first FE circuit, wherein the first FE circuit schedules the geometry workloads for execution on the plurality of shader engines; and
in a second mode, scheduling the geometry workloads at the first FE circuit and the at least one second FE circuit, wherein the first FE circuit schedules the geometry workloads for execution on a first subset of the plurality of shader engines and the at least one second FE circuit schedules the geometry workloads for a second subset of the plurality of shader engines.

12. The method of claim 11, further comprising:
selectively connecting the first FE circuit to the second subset of the plurality of shader engines in the first mode or the at least one second FE circuit to the second subset of the plurality of shader engines in the second mode.

13. The method of claim 12, wherein scheduling the geometry workloads for execution on the plurality of shader engines in the first mode comprises scheduling the geometry workloads for concurrent execution by the plurality of shader engines, and wherein scheduling the geometry workloads for execution on the first subset and the second subset in the second mode comprises scheduling the geometry workloads for concurrent execution on the first subset and the second subset in the second mode.

14. The method of claim 13, further comprising:
selectively scheduling the geometry workloads in the first mode or the second mode based upon at least one of a complexity or a graphics resolution of at least one application that is generating the geometry workloads.

15. The method of claim 14, wherein scheduling the geometry workloads for execution on the plurality of shader engines in the first mode comprises scheduling the geometry workloads for execution on the plurality of shader engines in the first mode for a first application requiring at least one of a first complexity or a first graphics resolution.

16. The method of claim 15, wherein scheduling the geometry workloads for concurrent execution on the first subset and the second subset of the plurality of shader engines and the second mode comprises scheduling the geometry workloads for concurrent execution on the first subset and the second subset of the plurality of shader engines for a second application requiring at least one second complexity or a second graphics resolution, the at least one of the second complexity or the second graphics resolution being lower than the at least one of the first complexity or the first graphics resolution.

17. An apparatus, the apparatus comprising:
a plurality of shader engines;
a plurality of front end (FE) circuits; and
a partition switch configured to map subsets of the plurality of FE circuits to corresponding subsets of the plurality of shader engines based on characteristics of an application that provides commands for execution on the plurality of shader engines, and wherein the subsets of the plurality of FE circuits are configured to schedule geometry workloads for the corresponding subsets of the plurality of shader engines.

18. The apparatus of claim 17, wherein the plurality of FE circuits are configured based on different levels of user experience corresponding to at least one of different complexities or different graphics resolutions.

19. The apparatus of claim 17, wherein a first FE circuit in the plurality of FE circuits is configured based on a first level of user experience corresponding to at least one of a first complexity or a first graphics resolution, and wherein at least one second FE circuit in the plurality of FE circuits is configured based on at least one second level of user experience corresponding to at least one of a second complexity or a second graphics resolution, the at least one of the first complexity or the first graphics resolution being higher than the at least one of the second complexity or the second graphics resolution.

20. The apparatus of claim 17, wherein the partition switch is configured to determine an operating mode from a plurality of modes based on characteristics of an application that provides commands for execution on the plurality of shader engines, and wherein the partition switch is configured to map the subsets of the plurality of FE circuits to the corresponding subsets of the plurality of shader engines based on the operating mode.

* * * * *